Patented June 11, 1935

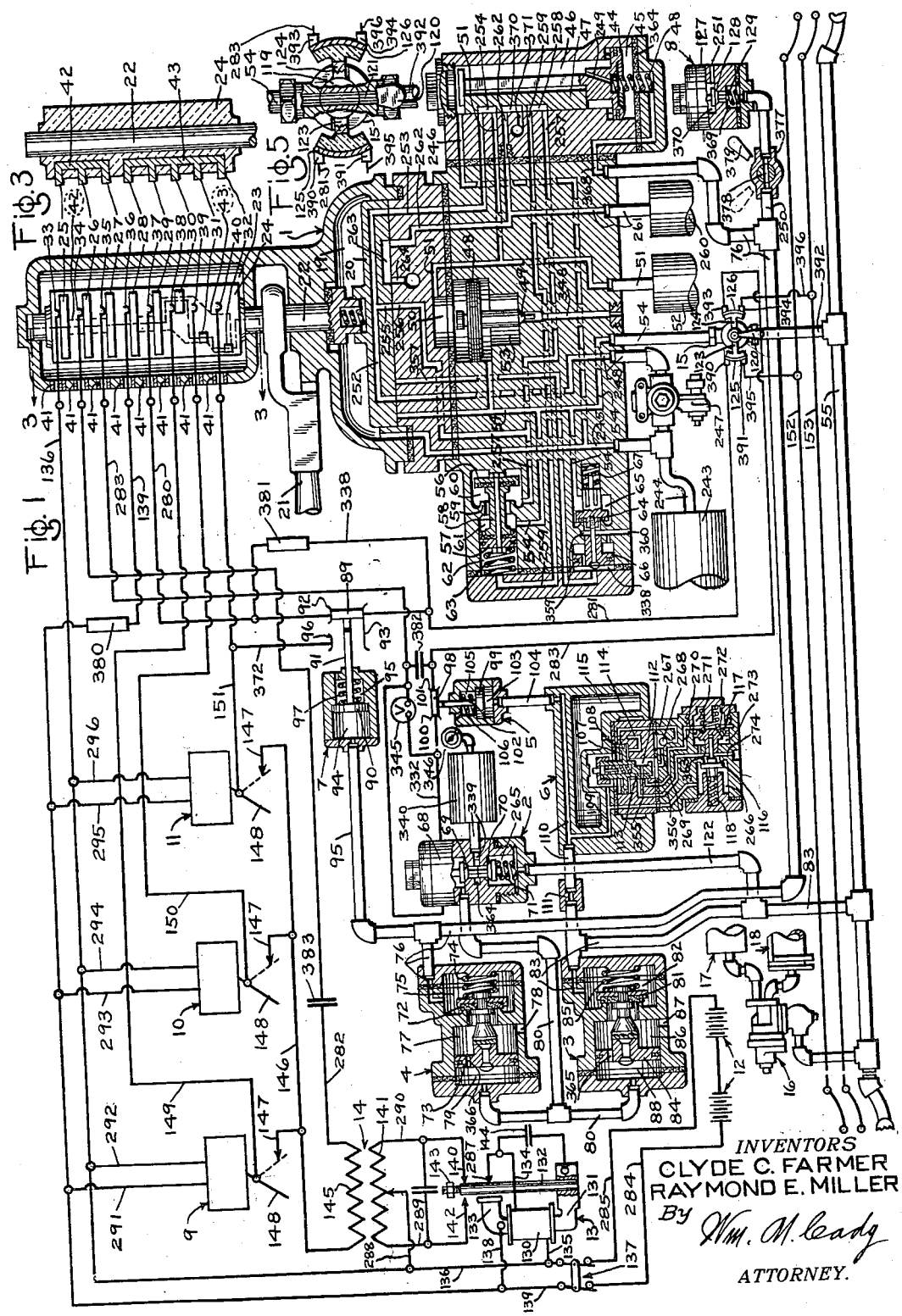

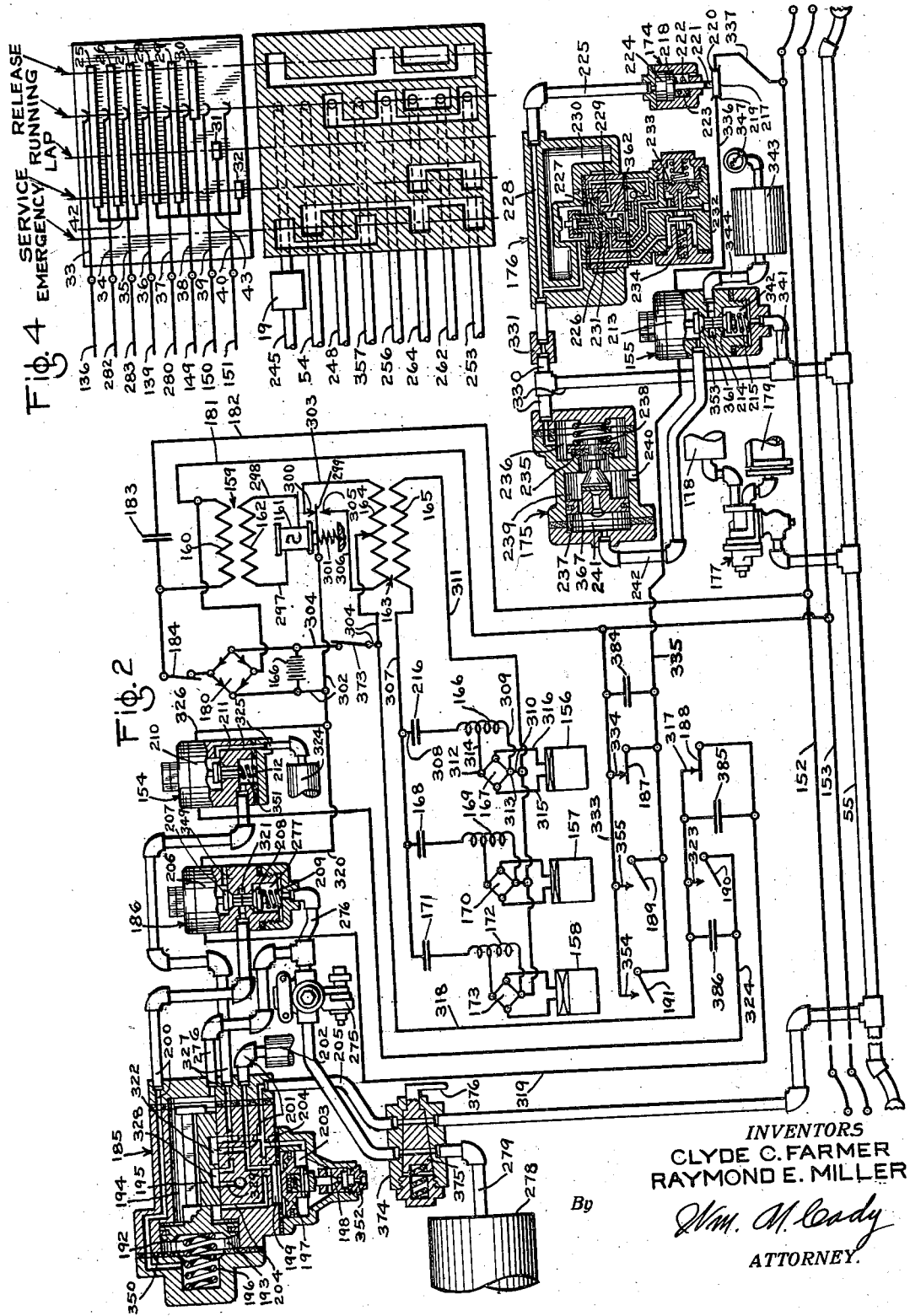

2,004,655

UNITED STATES PATENT OFFICE 2,004,655

REMOTE CONTROLLED BRAKE

Clyde C. Farmer, Pittsburgh, and Raymond E. Miller, Wilkinsburg, Pa., assignors to The Westinghouse Air Brake Company, Wilmerding, Pa., a corporation of Pennsylvania Application November 3, 1933, Serial No. 696,476

6 Claims. (Cl. 303—20)

This invention relates to train brakes and more particularly to means for varying the pressure of fluid in the brake pipe for controlling the brakes on a train.

In a train equipped with the usual fluid pressure apparatus, the brakes are adapted to be applied when the engineer's brake valve device is operated to reduce the pressure of the fluid in the brake pipe and are adapted to be released after an application when the brake valve device is operated to supply fluid under pressure to the brake pipe. It is evident that a reduction in brake pipe pressure and an increase in brake pipe pressure are effective first at the front end of the train and then become effective serially from car to car toward the rear end of the train, thereby causing the brakes to be applied serially and released serially.

Due to this serial action of the brakes, when effecting an application the train slack will run in toward the front end of the train, and when effecting a release after an application, the train slack will run out toward the rear end. This change in slack conditions is not objectionable on relatively short trains, but on long trains it may cause severe and damaging shocks, and may even cause a break-in-two when the slack runs out.

In order to reduce the above mentioned slack action, it has heretofore been proposed, in the pending application for United States Letters Patent, of Raymond E. Miller and Thomas W. Masterman, filed April 16, 1932, Serial No. 605,628, to provide an electrically controlled equipment on one or more control cars in the train remote from the locomotive and operative simultaneously with the engineer's brake valve device on the locomotive to duplicate, on the control cars, the function of the brake valve device, which in effect divides the train into sections of such length that the slack action is greatly reduced. Said equipment also includes electro-responsive means on the locomotive and control cars operative upon deenergization to locally initiate a sudden reduction in brake pipe pressure. This equipment requires the use of five wires extending throughout the length of the train.

The principal object of the invention disclosed herein is to provide an equipment of the above mentioned character on a locomotive and on a single control car which employs only two wires extending throughout the length of the train.

In order to accomplish this object, means are provided on the locomotive for supplying to the train wires alternating current which is periodically interrupted at different frequencies, and means on the control car selectively responsive to the frequency of such variations to locally initiate the application and release of the brakes and to locally hold the brakes applied, and also to control the circuit to the aforementioned electro-responsive means for locally initiating a sudden reduction in brake pipe pressure.

Other objects and advantages will appear in the following more detailed description of the invention.

In the accompanying drawings; Fig. 1 is a diagrammatic view, mainly in section, of a locomotive brake equipment of a type responsive to changes in traffic conditions and embodying our invention; Fig. 2 is a diagrammatic view of a remote brake controlling unit such as is proposed to be employed on the caboose at the rear end of the train; Fig. 3 is a view of the switch portion of the brake valve device taken on the line 3—3 of Fig. 1; Fig. 4 is a development view of the brake valve device and switch shown in Fig. 1 and illustrating diagrammatically the various communications established and electrical contacts made in the various positions of the brake valve device; and Fig. 5 is an enlarged detail elevational view, partly in section, of a combined double-heading cock and switch device for the locomotive equipment.

As shown in Fig. 1, the locomotive brake equipment comprises a brake valve device 1, an emergency magnet device 2, a brake pipe vent valve device 3, a vent valve device 4, an emergency switch device 5, a quick acting valve device 6, a switch device 7, train control means 8 governed automatically by traffic conditions, coding devices 9, 10 and 11, a source of direct current, such as a storage battery unit 12, a source of alternating current, such as a vibrating reed alternator 13, a transformer 14, a combined cut-out cock and switch device 15, and a fluid pressure brake equipment which, for the purpose of illustration, may be of any type, such for instance as the usual type employed on cars in a train and comprising a triple valve device 16, an auxiliary reservoir 17 and a brake cylinder 18. The equipment also includes two train wires 152 and 153 which extend throughout the length of the train.

The brake valve device 1 comprises a casing having a chamber 19 containing a rotary valve 20 adapted to be turned to various brake controlling positions by means of a handle 21 operatively connected to said rotary valve by means of a shaft 22. The shaft 22 extends into a chamber 23 and secured to said shaft in said chamber is an insulating sleeve or drum 24 which is provided with a plurality of contacts 25, 26, 27, 28, 29, 30, 31 and 32. Said contacts move with the drum 24 and are at various times adapted to engage respective contact fingers 33, 34, 35, 36, 37, 38, 39 and 40, according to the position which the brake valve device may occupy. The contact fingers 33 through 40 are carried in the casing wall, said fingers being properly insulated from the casing and from each other in any suitable manner, such as by means of insulating bushings 41. As shown in Fig. 3, the contacts are preferably molded in the drum 24, the contacts 25, 26 and 27 being connected together by means of a bridge 42 within the drum, while the contacts 28 through 32 are connected together by means of a bridge 43 within the drum 24.

Preferably associated with the brake valve device is a brake application valve device comprising a piston 44, having at one side a chamber 45 and at the opposite side a valve chamber 46 containing a slide valve 47 adapted to be operated by said piston. A spring 48 is provided in chamber 45 for urging the piston 44 and slide valve 47 to their normal position, as shown in the drawings.

The brake application valve device is adapted at one time to control an equalizing discharge valve mechanism comprising a piston 48 and a brake pipe discharge valve 49 adapted to be operated by said piston. The equalizing piston has at one side a chamber 50 connected through passage and pipe 51 to an equalizing reservoir 52 and at the opposite side a chamber 53 connected through passage and pipe 54 to the combined double-heading cock and switch device 15.

A brake pipe cut-off valve device is also adapted to be controlled by the brake application valve device, said cut-off valve device comprising a valve 56 and a piston 57 connected to said valve by means of a stem 58 and adapted to move said valve into engagement with a seat rib 59. The valve 56 is contained in a chamber 60 which is open to a chamber 61 at one side of piston 57 when the valve 56 is not engaging seat rib 59. The piston 57 has at the opposite side a chamber 62 containing a spring 63 acting on said piston for urging said piston and the valve 56 to the position shown in the drawings.

A brake pipe vent valve is provided in the brake valve device and comprises a vent valve 64 contained in a chamber 65 communicating through passage and pipe 54 with the combined double-heading cock and switch device 15, and a piston 66 for unseating said vent valve. A spring 67 is provided for seating said vent valve.

The brake application valve device is adapted to be controlled either by the emergency magnet device 2 and vent valve device 4 or by the traffic controlled means 8.

The emergency magnet device 2 comprises a magnet 68 and a pair of oppositely seating valves 69 and 70. Energization of magnet 68 is adapted to seat valve 69 and unseat valve 70. A spring 71 is provided to seat valve 70 and unseat valve 69 upon deenergization of the magnet 68. The magnet is so designed as to be slow acting, that is, there is a time interval between the opening of the circuit through said magnet and the operation of the valves 69 and 70 controlled by said magnet.

The vent valve device 4 comprises a vent valve 72, a piston 73 for unseating said vent valve and a spring 74 for seating said vent valve. The vent valve 72 is contained in a chamber 75 which is connected to the application valve piston chamber 45 through the medium of a pipe and passage 76 and a passage 368. The vent valve piston 73 has at one side a chamber 77 open to the atmosphere through a passage 78 and at the other side a chamber 79 connected to the emergency magnet device 2 by means of a pipe 80.

The vent valve device 3 comprises a vent valve 81 contained in a chamber 82, which is connected through passage and pipe 83 to the brake pipe 55, and a piston 84 for unseating said vent valve, a spring 85 being provided in chamber 82 for urging said vent valve to its seat. The piston 84 has at one side a chamber 86 open to the atmosphere through a passage 87, and at the opposite side a chamber 88 connected to pipe 80 leading to the emergency magnet device 2.

The switch device 7 comprises a movable contact member 89, a piston 90 and a piston stem 91 connecting said piston to said contact member and properly insulated from said contact member. The piston 90 is adapted to move said contact member so as to connect a fixed contact 93 with one or the other of a pair of fixed contacts 92 and 96, the piston having at one side a chamber 94 connected by pipe 95 to pipe 76 leading to vent valve chamber 75 in the vent valve device 4, and at the opposite side a vented chamber 95 containing a spring 97 for operating said piston, so as to move the contact member 89 out of engagement with the fixed contact 92 and into engagement with the fixed contact 96.

The switch device 5 comprises a movable contact member 98, a piston 99 for moving said member into engagement with a pair of fixed contacts 100 and 101 and a piston stem 102 operatively connecting said member and piston, said piston stem being properly insulated from said contact member. The piston 99 has at one side a chamber 103 connected through a pipe 104 to the quick acting valve device 6 and at the opposite side a vented chamber 105 containing a spring 106 for urging the contact member 98 out of engagement with the fixed contacts 100 and 101.

The switch device 5 is controlled by the quick acting valve device 6, which comprises a casing containing a piston 107 having at one side a chamber 108 connected through passage 109 to passage 110 which leads to the pipe 104 and which also leads to the pipe 110 which is connected to pipe 83 through a choked coupling 111. At the opposite side of piston 107 is a valve chamber 112 containing a slide valve 113 adapted to be operated by said piston, the valve chamber 112 being connected through a passage 114 to a volume chamber 115 formed in the casing. The quick acting valve device further comprises a vent valve device comprising a vent valve 116, a piston 117 for unseating said vent valve and a spring 118 for seating said vent valve.

The combined double-heading cock and switch device 15 comprises a casing having a plug valve 119 mounted therein which is adapted to be rotated by a handle 120. This valve 119 has a passage 121 normally establishing communication between a pipe 392 leading from the brake pipe 55 and the pipe 54 leading from the brake valve device 1 and is provided with switch arms 123 and 124. The arm 123 carries a contact plate 125 and the arm 124 carries a contact plate 126, there being suitable insulating material interposed between said arms and their respective contact plates. With the device in its normal position, as shown in Figs. 1 and 5, the contact plate 125 connects the terminal 390 to the terminal 391, and the contact plate 126 connects the terminal 393 to the terminal 394.

The traffic controlled means 8 comprises a magnet 127 and a valve 128. Energization of the magnet 127 is adapted to seat valve 128. A spring 129 is provided to unseat said valve when the magnet 127 is deenergized.

The alternator 13 is operated by current supplied by the battery unit 12 for delivering alternating current to the primary winding 141 of the transformer 14. Said generator may comprise a magnet coil 130 surrounding a pole piece 131 of substantially U-shape, the pole piece being extended at one end so as to carry one end of a flexible armature 132, the other end of the armature being adapted to vibrate between the contact leg 133 of the pole piece and a contact 287 connected by a wire 134 to one terminal of the coil 130, the other terminal of said coil being connected by a wire 135 to a wire 136 leading to a manually operated switch device 137. The core 131 is connected by a wire 138 to a wire 139 leading to the switch device 137.

The armature 132 is normally biased away from the contact leg 133 of the pole piece 131, in which position said armature engages the contact 287 connected to wire 134 and a contact 140 connected to the right hand end of the primary winding 141 of the transformer 14. When the coil 130 is energized, the armature is disengaged from the contact 287 and engages the contact leg 133 of the pole piece and a contact 142 connected to the left hand end of the primary winding 141 of the transformer 14.

The vibrating armature 132 is provided with an adjustable weight 143 for varying the period of oscillation of said armature. In the present instance, the weight is preferably adjusted to cause the armature to vibrate at a frequency of one hundred oscillations per second, so that the alternating current delivered to the primary winding 141 of the transformer 14 will have a frequency of 100 cycles per second.

For the purpose of reducing the severity of the arc caused when the electric circuit is opened at the contact 287, a condenser 144 is connected in a shunt circuit around said contact, one terminal of said condenser being connected to the pole piece 131 and the other terminal being connected to the wire 134.

One end of the secondary winding 145 of the transformer 14 is connected by a wire 282 to the contact finger 34 in the brake valve device 1, while the other end of said winding is connected by a wire 146 to the contacts 147 in the coding devices 9, 10 and 11, which will now be described.

Alternating current induced in the secondary winding 145 of the transformer 14 on the locomotive is periodically interrupted, or coded, by the coding devices 9, 10 and 11 and then supplied to the brake valve device 1 for transmission through the train wires 152 and 153. Said devices may be of the type disclosed in Patent No. 1,913,826 of Herman G. Blosser, issued June 13, 1933, comprising an oscillating contact 148 connected, respectively, by the wires 149, 150 and 151 to the contact fingers 38, 39 and 40 in the brake valve device 1. The coding devices are operated by current supplied from the battery unit 12 and when so operated, the oscillating contacts 148 open and close the circuits from the contacts 147 to the respective wires 149, 150 and 151.

The coding devices are timed, in the manner disclosed in the aforementioned pending application, so that the contacts 148 oscillate at a constant predetermined frequency, and each at a different frequency. For instance, the period of oscillation of the contact 148 in the coding device 9 may be adjusted so that the alternating current supplied to the contact finger 38 in brake valve device 1 is periodically interrupted at a frequency of three cycles per second. The period of oscillation of the contacts 148 in the coding devices 10 and 11 may be adjusted so that the alternating current supplied to the respective contact fingers 39 and 40 in the brake valve device is periodically interrupted at a frequency of two cycles per second and four-thirds cycles per second, respectively. It should be understood, of course, that our invention is in no manner limited to the above mentioned frequencies, but that these frequencies are specified by way of illustration only.

The triple valve device 16 is adapted to operate in accordance with variations in pressure in the brake pipe 55 for controlling the supply of fluid under pressure from the brake pipe 55 to the auxiliary reservoir 17, the supply of fluid under pressure from the auxiliary reservoir 17 to the brake cylinder 18 and the release of fluid under pressure from the brake cylinder, in the usual well known manner. As the construction and operation of these parts of the brake equipment are so well known, it is deemed unnecessary to provide further description of the structure or function in the specification.

The remote brake controlling unit shown in Fig. 2 comprises a service application and release valve device 185, a service application and release magnet valve device 186 for controlling the operation of the device 185, a lap magnet valve device 154 for controlling the degree of brake application, an emergency magnet valve device 155, a relay device 156 for controlling the operation of contacts 187 and 188 which, in turn, control, respectively, the circuits to the emergency magnet valve devices 2 and 155 on the locomotive and remote control units, respectively, and to the magnet valve device 186, a relay device 157 for controlling the operation of contacts 189 and 190 which, in turn, control the circuits to said emergency magnet valve devices and to the magnet valve device 154, respectively, and a relay device 158 for controlling the operation of a contact 191 which controls the circuit to said emergency magnet valve devices.

As shown in Fig. 2, the remote brake controlling unit further includes electrical apparatus and circuits for selectively controlling the operation of the relays according to the frequency of the impulses in the alternating current supplied to the train wires 152 and 153 by the coding devices 9, 10 and 11 on the locomotive, which apparatus and circuits may be of the same general character as those disclosed in Paul N. Bossart's Patent No. 1,773,472, issued August 19, 1930, with the exception that the master relay is operated by alternating current instead of being responsive to the relative polarity of the current supplied thereto. Said apparatus comprises a transformer 159 having its primary winding 160 connected across the train wires 152 and 153 for energizing a relay device 161 through the transformer secondary winding 162 and causing said relay to operate at a frequency which corresponds to the frequency of the impulses in the current supplied to the train wires.

Associated with the master relay device 161 is a transformer 163 having a primary winding 164 and a secondary winding 165. A suitable source of energy, such as a battery 166, is adapted to supply direct current to the primary winding 164, the direction of flow through said winding being periodically reversed and reestablished in original direction, through the operation of the relay device 161, at the same frequency as the periodic interruptions in the current caused by the operation of said device, which, as hereinbefore mentioned, operates at a frequency which corresponds with the frequency of the interruptions in the current supplied to the train wires 152 and 153.

A manually operated switch device 373 is connected in the circuit with the battery 166 and the relay device 161.

A plurality of circuits is connected in parallel across the secondary winding 165 of the transformer 163, each circuit comprising a condenser and a reactor by means of which the respective circuits are tuned to the frequencies, respectively, of the alternating current induced in said winding through the operation of the relay device 161. For instance, the circuit which comprises the condenser 216 and the reactor 166 is tuned to resonance at a frequency of three cycles per second, which corresponds with the frequency with which the coding device 9 on the locomotive operates. The relay 156 is connected across a portion of the reactor 166 through a rectifier 167 and is adapted to be energized for operating the contacts 187 and 188 when the circuit through the condenser 216 and the reactor 166 is resonant.

The circuit through the condenser 168 and the reactor 169 is tuned to resonance at a frequency of two cycles per second, which corresponds with the frequency with which the coding device 10 on the locomotive operates. The relay 157 is connected across a portion of the reactor 169 through a rectifier 170 and is adapted to be energized for operating the contacts 189 and 190 when the circuit through the condenser 168 and the reactor 169 is resonant.

In a similar manner, the circuit which includes the condenser 171 and the reactor 172 is tuned to resonance at four-thirds cycle per second, or the same frequency as that with which the coding device 11 on the locomotive operates. The relay 158 is connected, through a rectifier 173, with a portion of the reactor 172 and is adapted to be energized for operating the contact 191 when the circuit through said condenser and reactor is resonant.

The remote brake controlling unit may also include, in addition to the equipment above listed, an emergency switch device 174, a brake pipe vent valve device 175, a quick acting valve device 176, a triple valve device 177 by means of which the application and release of the brakes may be effected in the usual manner, an auxiliary reservoir 178, and a brake cylinder 179.

For charging the battery 166, a rectifier 180 may be connected to the wires 181 and 182, leading to the train wires 152 and 153, in parallel with the primary winding 160 of the transformer 159, there being a condenser 183 in the circuit to both the primary winding and to said rectifier, the purpose of the condenser being explained hereinafter. A manually operated switch 184 may be provided in the battery charging circuit for controlling the charging of the battery.

The equipment on both the locomotive and the remote controlling unit may also include various condensers and filter devices, the purpose of which will appear from the description hereinafter.

The service application and release valve device 185 comprises a piston 192 having a chamber 193 at one side connected through a passage and pipe 200 to the magnet valve device 186, and a valve chamber 194 at the opposite side containing a slide valve 195 adapted to be operated by said piston. A spring 196 is provided in piston chamber 193 and acts on the piston 192 for urging said piston and slide valve 195 to their release positions shown in the drawings. This device also contains the usual equalizing discharge valve mechanism comprising an equalizing piston 197 and a brake pipe discharge valve 198 adapted to be operated by said piston. The equalizing piston 197 has at one side a chamber 199 connected through passage and pipe 201 to an equalizing reservoir 202 and at the opposite side a chamber 203 connected through passage 204 and pipe 205 to the brake pipe 55.

The service application and release magnet valve device 186 comprises a magnet 206, a pair of oppositely seating valves 207 and 208 and a spring 209 acting on the valve 208. Energization of the magnet 206 is adapted to seat valve 207 and to unseat valve 208, while upon deenergization of said magnet, spring 209 is adapted to seat valve 208 and to unseat valve 207.

The lap magnet valve device 154 comprises a magnet 210, a valve 211 adapted to be seated upon energization of said magnet, and a spring 212 for unseating said valve when the magnet 210 is deenergized.

The emergency magnet valve device 155 comprises a magnet 213, a pair of oppositely seating valves 214 and 353. Energization of magnet 213 is adapted to seat valve 353 and to unseat valve 214. A spring 215 is provided to seat valve 214 and to unseat valve 353 upon deenergization of the magnet 213. The magnet 213 is of the slow acting type, that is, it is so designed that there is a time interval between the opening of the circuit through said magnet and the operation of the valves 214 and 353 controlled by said magnet.

The emergency switch device 174 comprises a movable contact 217, a piston 218 for moving said contact into engagement with two fixed contacts 219 and 220, a stem 221 operatively connecting piston 218 to contact 217 and properly insulated from said contact, and a spring 222 acting on the piston 218 for urging the contact 217 out of engagement with contacts 219 and 220. The piston 218 has at one side, a vented chamber 223 containing the spring 222, and at the opposite side a chamber 224 connected by means of a pipe 225 to the quick acting valve device 176.

The quick acting valve device 176 comprises a casing containing a piston 226 having at one side a chamber 227 connected to a passage 228 and having at the opposite side a valve chamber 362 connected through a passage 229 to a volume reservoir 230 and containing a slide valve 231 adapted to be operated by said piston. The valve device 176 further comprises a vent valve mechanism consisting of a vent valve 232, a piston 233 for unseating said vent valve and a spring 234 for urging said vent valve to its seat.

The vent valve device 175 comprises a vent valve 235 contained in a chamber 236, and a piston 237 for unseating said vent valve, a spring 238 being provided in chamber 236 for urging said vent valve to its seat. The piston 237 has at one side a chamber 239 connected to the atmosphere through a passage 240 and at the opposite side a chamber 241 connected to the emergency magnet valve device 155 by means of a pipe 242.

In operation, fluid under pressure is supplied to a main reservoir 243 on the locomotive and flows from said main reservoir through pipe 244 and passage 245 to the rotary valve chamber 19 in the brake valve device 1 and from passage 245 through passage 246 to the valve chamber 46 in the brake application valve device.

Fluid from the main reservoir pipe 244 is also supplied to a feed valve device 247 which may be of the usual construction and operative to reduce the pressure of fluid carried in the main reservoir to the pressure desired to be carried in the brake pipe 55. Said feed valve device operates to supply fluid at the reduced pressure to pipe and passage 248 leading to the seat of the rotary valve 20.

Fluid at main reservoir pressure supplied to valve chamber 46 in the brake application valve device flows through a port 249 in piston 44 to chamber 45 and from thence through passage 368 into pipe 76, from whence it flows into pipe 250 leading to the traffic controlled magnet device 8.

Assuming the traffic controlled magnet 127 to be energized, the magnet controlled valve 128 is, as a result, seated, thereby closing off communication from pipe 250 past said valve and through the passage 251 to the atmosphere. With said valve thus seated, fluid supplied through port 249 in the brake application valve piston 44 builds up a pressure in chamber 45 and in pipe 76 equal to the pressure in the brake application valve chamber 46, which permits spring 68 to hold the piston 44 and valve 47 in the normal position shown in the drawings.

Fluid under pressure supplied to pipe 76 flows to chamber 75 in the vent valve device 4 and from pipe 76 through pipe 95 to chamber 94 in the switch device 7. Fluid thus supplied to chamber 94 moves the piston 90 and contact 89 to their normal position shown in the drawings, in which position contact 89 connects contacts 92 and 93.

Assuming the brake valve device 1 to be in running position, fluid at feed valve pressure flows from passage 248 through port 252 in the rotary valve 20 to passage 253 and from thence through cavity 254 in the brake application slide valve 47 and passage 51 to the equalizing discharge valve piston chamber 50 and to the equalizing reservoir 52.

Fluid at feed valve pressure also flows from port 252 in rotary valve 20 through port 255 and passages 256 and 257 to the cut-off valve chamber 60 and to the seat of the brake application slide valve 47. From passage 257 fluid flows through a cavity 258 in said slide valve to passage 259 and from thence to the cut-off valve piston chamber 62, thereby equalizing the opposing fluid pressures acting on the cut-off valve 56 and cut-off valve piston 57, whereupon spring 63 moves said piston and valve to the position shown in the drawings, in which position fluid at feed valve pressure is permitted to flow from the cut-off valve chamber 60 to chamber 61 and from thence through passage 54 to the equalizing discharge valve piston chamber 53, and to the brake pipe vent valve chamber 65. Assuming that the combined double-heading cock and switch device 15 is in its normal position, that is, in position for single locomotive operation, fluid under pressure supplied to passage 54 flows through pipe 54, the device 15 and pipe 392 to the brake pipe 55. Thus, said chambers and the brake pipe are charged to the pressure supplied by the feed valve device.

Since the equalizing piston chamber 50 is also charged with fluid at feed valve pressure, the opposing pressures acting on the piston 48 are substantially equal and said piston maintains the brake pipe discharge valve 49 seated in the usual well known manner.

With the brake valve device 1 in running position, a reduction limiting reservoir 260 is vented to the atmosphere through a pipe and passage 261, passage 262, cavity 263 in the rotary valve 20 and atmospheric passage 264.

Fluid under pressure supplied to the brake pipe 55 flows through pipes 83 and 122 to the spring chamber 265 in the emergency magnet valve device 2. From pipe 83, fluid also flows through passage 83 in the vent valve device 3 to chamber 82.

Fluid under pressure supplied to pipe 83 flows through the choked coupling 111, pipe and passage 110 in the quick acting valve device 6, and pipe 104 to the piston chamber 103 of the emergency switch device 5. From passage 110 fluid flows through passage 109 to vent valve chamber 266 and piston chamber 108 in said quick acting valve device. With the piston 107 in the normal position, shown in the drawings, fluid flows from chamber 108 through passage 267, past check valve 268 and through passage 269 to valve chamber 112 and from thence through passage 114 to the volume chamber 115, thereby charging valve chamber 112 and volume chamber 115 to brake pipe pressure.

With the vent valve piston 107 in the normal position shown in the drawings, passage 270 leading to the vent valve piston chamber 271 is lapped by the slide valve 113, and chamber 271 being vented through a port 272 in piston 117 to a chamber 273 which is open to the atmosphere through a passage 274, permits spring 118 to maintain the vent valve 116 seated.

When the pressure in piston chamber 103 of the switch device 5 is built up to a predetermined degree, the opposing pressure of spring 106 is overcome and said piston operates to move contact 98 into engagement with contacts 100 and 101.

With the remote unit shown in Fig. 2 located at the rear end of the train, said unit operates to supply fluid under pressure to the brake pipe 55 at the rear end of the train at the same time as the locomotive apparatus operates to supply fluid under pressure to the brake pipe 55 at the front end, in a manner which will now be described.

With the contacts 92 and 93 connected by the contact 89, as hereinbefore explained, and with the brake valve device 1 in running or release positions, the coding device 9 is connected in a circuit with the train wires 152 and 153, which circuit comprises the oscillating contact 148 in said coding device, wire 149, contact finger 38 in the brake valve device, contact 30, bridge 43, contact 29, contact finger 37, wire 280, contacts 92, 89 and 93 in the switch device 7, wire 281, terminal 390, contact plate 125 in the combined double-heading cock and switch device 15, terminal 391 and wire 395, which is connected to the train wire 152, and which circuit also comprises the stationary contact 147 in the coding device 9, wire 146, the secondary winding 145 of the transformer 14, wire 282, contact finger 34 in the brake valve device, contact 26, bridge 42, contact 27, contact finger 35, wire 283, terminal 393, contact plate 126 in the combined cut-out cock and switch device 15, terminal 394, and wire 396, which is connected to the train wire 153.

The switch device 137 on the locomotive and the switch device 373 on the remote control unit may now be closed. The closing of the switch device 137 connects the wire 284, leading to one terminal of the battery unit 12, with the wire 139, and the wire 285, leading to the other terminal of the battery unit 12, with the wire 136.

The armature 132 of the alternator 13 being in the normal position shown in the drawings, a circuit is completed from the wire 136 to the wire 139 through said alternator by way of wire 135, magnet coil 130, wire 134, contact 287, armature 132, pole piece 131 and wire 138. The alternator is thus energized and the armature is flexed leftwardly into engagement with the contacts 133 and 142. A circuit through the left hand end of the primary winding 141 of the transformer 14 is then momentarily established from wire 136 through wire 288, left end of winding 141, wire 289, contact 142, armature 132, contact 133, and wire 138 to the wire 139. Thus an electrical impulse is induced in the secondary winding 145 of the transformer 14.

The instant that the armature 132 separates from contact 287, the circuit through the coil 130 is interrupted and after the armature has made contact with the contact 133, the tension of said armature returns the armature into engagement with contacts 287 and 140, which reestablishes the circuit through the coil 130, and the operation is thus continually repeated.

When the armature 132 engages the contacts 287 and 140, a circuit through the right hand end of the primary winding 141 of the transformer 14 is momentarily established from the wire 136 through wire 288, the right hand end of transformer winding 141, wire 290, contact 140, armature 132, pole piece 131 and wire 138 to wire 139. Thus, the current in the primary winding 141 of the transformer 14 is periodically reversed and reestablished in original direction at a frequency of one hundred cycles per second. As a result of this periodic current in said primary winding, alternating current of a corresponding frequency, or one hundred cycles per second, is induced in the secondary winding 145 of the transformer 14.

With the switch device 137 in the closed position, battery current is supplied from the wires 136 and 139 to the coding device 9 through the wires 291 and 292, to the coding device 10 through the wires 293 and 294, and to the coding device 11 through the wires 295 and 296. Said coding devices are thereby energized and the contacts 148 caused to oscillate in the manner described in the aforementioned Patent No. 1,913,826 of Herman G. Blosser.

The circuit from the contacts 147 and 148 of the coding device 9 to the train wires 152 and 153 being closed by the brake valve device 1, the switch device 7, and the combined doubleheading cock and switch device 15, in the manner previously described, the oscillation of the contact 148 into and out of engagement with the contact 147 will cause the current supplied to the train wires from the secondary winding 145 of the transformer 14 to be periodically interrupted, or coded, at the frequency at which the contact 148 oscillates. In the present instance, the coding device operates to code the current supplied to the train wires at three impulses per second.

Current thus supplied to the train wires 152 and 153 flows through the wires 181 and 182 to the primary winding 160 of the transformer 159 on the remote controlling unit shown in Fig. 2. The current thereby induced in the secondary winding 162 of said transformer flows through wires 297 and 298 to the master relay device 161, causing said device to be alternately energized and deenergized at the frequency of the current inpulses supplied to the primary winding 160.

When the master relay device 161 is energized, the contact 299 is moved into engagement with the contact 300 against the tension of a spring 301. With the switch device 373 closed, a circuit through the right hand end of the primary winding 164 of the transformer 163 is then momentarily established from one terminal of the battery 166 through wire 302, contacts 299 and 300, wire 303, primary winding 164, wire 304 and switch device 373 to the other terminal of the battery 166. Thus an electrical impulse is induced in the secondary winding 165 of the transformer 163.

When the master relay device 161 is deenergized, the spring 301 immediately moves the contact 299 out of engagement with contact 300 into engagement with the contact 305. A circuit through the left hand end of the primary winding 164 of the transformer 163 is then momentarily established from one terminal of the battery 166 through wire 302, contacts 299 and 305, wire 306, primary winding 164, wire 304 and the switch device 373 to the other terminal of the battery 166, and current is momentarily induced in the secondary winding 165 of the transformer 163.

As the master relay device 161 thus operates to reverse and reestablish in original direction the current flow in the primary winding 164 at a frequency of three cycles per second, alternating current having a corresponding frequency is induced in the secondary winding 165. Three cycle alternating current thus induced in said secondary winding is supplied to the tuned circuits which include the relay devices 156, 157 and 158 and their associated condensers and reactors.

Inasmuch as the circuit through the condenser 216 and the reactor 166 is tuned to resonance at a frequency of three cycles per second, the circuit which includes the secondary winding 165 of the transformer 163, wires 307 and 308, condenser 216, reactor 166, and wires 309, 310 and 311 becomes energized by the current induced in said secondary winding. The relay device 156 is supplied with rectified continuous current through the rectifier 167, the terminals 312 and 313 of which are connected across a portion of the reactor 166 by the wires 314 and 309 and the other terminals of which are connected by the wires 315 and 316 of the relay device 156. The relay device 156 is thereby energized, with the result that the contacts 187 and 188 are moved to their closed positions.

It will be understood that as the circuit which includes the condenser 168 and the reactor 169 and the circuit which includes the condenser 171 and the reactor 172 are tuned to resonance at a frequency of two and four-thirds cycles, respectively, the respective relays 157 and 158 are not operated when three cycle current is induced in the secondary winding 165 of the transformer 163 and therefore the contacts 189 and 190 controlled by the relay 157 and the contact 191 controlled by the relay 158 remain in the open position, as shown in the drawings.

In the closed position of the contact 188, said contact engages a contact 317, thereby closing a circuit from the battery 166 to the service application and release magnet valve device 186, through wire 304, the switch device 373, wire 318, contacts 317 and 188, and wire 319 leading to one terminal of the magnet 206, the other terminal of said magnet being connected by the wire 320 to the battery 166. The resulting flow of current through said circuit energizes the magnet 206, causing the valve 207 to be seated and the valve 208 to be unseated.

The remote unit is provided with a main reservoir 278 and means (not shown) for supplying fluid under pressure to said main reservoir. Fluid flows from said main reservoir through the pipe 279 to a feed valve device 275 which operates in the usual manner to reduce the pressure in the main reservoir 278 to that desired to be carried in the brake pipe 55 and supply fluid at the reduced pressure to a pipe 276.

Fluid at feed valve pressure thus supplied to pipe 276 flows to chamber 277 in the magnet valve device 186 and to valve chamber 194 of the service application and release valve device 185. The valve 208 being unseated by the energization of magnet 206 permits fluid to flow from chamber 277 to chamber 321 and from thence through pipe 200 to piston chamber 193 of the valve device 185. The opposing fluid pressures acting on piston 192 being thus equal, spring 196 maintains said piston and slide valve 195 in the release position shown in the drawings.

With the slide valve 195 in the release position, the passage 204 in the slide valve seat is open to valve chamber 194 past the end of said slide valve, so that fluid supplied by the feed valve device 275 to valve chamber 194 is permitted to flow to passage 204 and from thence through pipe 205 to the brake pipe 55, thus charging said brake pipe from the rear end of the train.

From passage 204, fluid flows to the equalizing discharge valve piston chamber 203 and also through cavity 322 to passage 201 leading to the equalizing discharge valve piston chamber 199 and equalizing reservoir 202. The equalizing piston 197 is thus subject on both sides to feed valve pressure and operates to hold the discharge valve 198 seated in the usual well known manner.

The contact 190 being in the open position, as hereinbefore explained, the circuit from the battery 166 to the lap magnet 210 is open, which circuit includes said battery, wires 304 and 318, contacts 323 and 190, wire 324, magnet 210 and wire 326 which is connected to wire 320 leading through wire 302 to said battery. The magnet 210 being thus deenergized, valve 211 is maintained unseated by the spring 212.

With the valve 211 thus unseated, a reduction limiting reservoir 324 is connected to the atmosphere through pipe and passage 325, past the valve 211 to chamber 351 and thence through pipe 327 and passage 327 in the valve device 185, cavity 328 in slide valve 195 and the atmospheric passage 329.

Fluid supplied to the brake pipe 55 on the remote control unit, in the manner above described, flows through pipe 330 to the vent valve chamber 236 and from pipe 330 through a choked coupling 331 to passage 228 in the quick acting valve device 176, the valve chamber 362 and volume chamber 230 of said device being charged to brake pipe pressure in the same manner as with the corresponding device 6 on the locomotive. From passage 228 fluid flows through pipe 225 to chamber 224 in the emergency switch device 174 and when a predetermined pressure is obtained in said chamber, the piston 218 is operated to move the contact 217 into engagement with contacts 219 and 220.

Fluid supplied to the brake pipe 55 on the remote control unit flows through pipes 330 and 341 to chamber 342 in the emergency magnet valve device 155.

When the switch device 7 on the locomotive operates to connect contacts 100 and 101 and the switch device 174 on the remote control unit operates to connect contacts 219 and 220, and with the contact 187 in the closed position, as hereinbefore mentioned, a circuit is completed from the battery unit 12 on the locomotive through the emergency magnet valve device 2 on the locomotive, the train wires 152 and 153, and the emergency magnet valve device 155 on the remote control unit, said devices being series connected in said circuit. Said circuit may be traced as follows: the battery unit 12, wire 285, switch device 137, wire 136, contact finger 33 in the brake valve device 1, contact 25, bridge 42, contact 27, contact finger 35, wire 283, magnet 68, wire 332, contacts 100, 98 and 101 of the emergency switch device 5, wire 283, terminal 393, contact plate 126 in the combined double-heading cock and switch device 15, terminal 394, wire 396, train wire 153, wires 181 and 333 on the remote control unit, contacts 334 and 187 of the relay device 156, wire 335, magnet 213, wire 336, contacts 219, 217 and 220 of the switch device 174, wire 337, train wire 152, wire 395 on the locomotive, terminal 391, contact plate 125 in the device 15, terminal 390, wire 281, contacts 93, 89 and 92 of the switch device 7, wire 280, and also from wire 281 to wire 280 through a wire 338 shunting the switch device 7, contact finger 37 in the brake valve device 1, contact 29, bridge 43, contact 28, contact finger 36, wire 139, switch device 137, and wire 284 leading to the battery unit 12.

The circuit to the magnets 68 and 213 on the locomotive and remote control unit, respectively, being closed, said magnets are energized. The energization of magnet 68 causes the valve 69 to be seated and the valve 70 to be unseated. With the valve 70 unseated, fluid supplied from the brake pipe 55 to the chamber 265 in the magnet valve device 2 flows past said valve into passage and pipe 339 to a volume reservoir 340, charging said reservoir to brake pipe pressure. In a similar manner, the energization of the magnet 213 on the remote control unit causes the valve 214 to be unseated, thereby opening communication from chamber 342 to a volume reservoir 343 through a pipe 344, which permits said reservoir to be charged to brake pipe pressure.

Inasmuch as the emergency magnets 68 and 213 on the locomotive and remote control unit, respectively, are series connected to the train wires, the integrity of the circuit which includes these magnets is indicated by a voltmeter 345 which may be connected across the wires 283 and 332 on the locomotive and by the pressure gages 346 and 347 connected to the volume reservoirs 340 and 343 on the locomotive and remote control unit, respectively.

Now, if the engineer desires to make a gradual reduction in brake pipe pressure to effect a service application of the brakes, he turns the brake valve device 1 from running position to service position, in which position passage 256 is lapped by the rotary valve 20 to prevent further flow of fluid under pressure to the brake pipe. Passage 253, which communicates through the brake application valve device with the equalizing discharge valve piston chamber 50 and equalizing reservoir 52, is connected through the rotary valve 20 to the atmospheric passage 264, so that fluid under pressure is permitted to flow from said chamber and reservoir to the atmosphere and thus reduce the pressure of fluid acting in said chamber. The higher brake pipe pressure acting in chamber 53 then shifts the piston 48 upwardly and unseats the brake pipe discharge valve 49, past which fluid under pressure is permitted to flow from the brake pipe 55 to the atmosphere by way of pipe 392, passage 121 in the combined double-heading cock and switch device 15, pipe and passage 54, discharge valve chamber 53, past the discharge valve 49 to passage 348 and from thence to the atmosphere through a choke plug having an orifice of the usual flow area to control the rate of reduction in brake pipe pressure.

In service position of the brake valve device 1, the contact 30 is moved out of engagement with the contact finger 38, thereby cutting off from the train wire 152 the supply of one hundred cycle alternating current coded to three impulses per second, and the contact 32 is moved into engagement with the contact finger 40. The contact 32 being connected to the train wire 152 through the bridge 43, contact 29, contact finger 37 and wires 280 and 281, and the contact finger 40 being connected by wire 151 to the oscillating contact 148 of the coding device 11, the circuit is complete from said coding device to the train wires, which permits one hundred cycle alternating current coded to four-thirds impulses per second to flow through the train circuit, including the primary winding 160 of the transformer 159 on the remote control unit. As a result, there is induced in the secondary winding 162 of the transformer 159, alternating current having a frequency of one hundred cycles per second coded to four-thirds impulses per second, which causes the master relay device 161 to operate at a frequency of four-thirds oscillations per second. Alternating current having a frequency of four-thirds cycles per second is thereby induced in the secondary winding 165 of the transformer 163.

Since the current now impressed on the tuned circuits has a frequency of four-thirds cycles per second, the circuit which includes the condenser 216 and the reactor 166, being tuned to a frequency of three cycles per second, becomes deenergized, and as a result the relay 156 becomes deenergized, so that the contacts 187 and 188 move out of engagement with the contacts 344 and 317, respectively.

When the contact 188 moves out of engagement with contact 317, the circuit is open from the battery 166 to the service application and release magnet 206, which circuit includes wire 394 connected to one terminal of said battery, the switch device 373, contacts 317 and 188, wire 319, magnet 206 and wire 320 which is connected by wire 302 to the other terminal of said battery. The resulting deenergization of said magnet permits spring 209 to seat valve 208 so as to cut off the supply of fluid to piston chamber 193 of the service application and release valve device 185. The valve 207 is unseated by the seating movement of valve 208, thereby opening communication through which fluid is vented from piston chamber 193, i. e., by way of passage and pipe 200, chamber 321 in the magnet valve device 186, past valve 207 and through an atmospheric passage 349.

Upon the venting of fluid under pressure from the piston chamber 193 of the service application and release valve device 185, the pressure in chamber 194 moves the piston 192 and slide valve 195 leftwardly to application position, in which position piston 192 engages a gasket 350.

In application position of slide valve 195, passage 204 is lapped by said slide valve, so as to prevent further flow of fluid at feed valve pressure from valve chamber 194 to the brake pipe and at the same time fluid is vented from the equalizing discharge valve piston chamber 199 and connected equalizing reservoir 202 through passage 201 and cavity 322 in the slide valve 195 to a passage and pipe 327 leading to chamber 351 in the magnet valve device 154.

The magnet 210 of the magnet valve device 154 remains deenergized at this time due to the fact that the circuit to said magnet remains open at contact 190 because the circuit which controls the operation of the respective relay 157 is not energized by four-thirds cycle alternating current. The deenergization of the magnet 210 permits spring 212 to hold the valve 211 unseated, which permits fluid vented from the equalizing discharge valve piston chamber 199 and equalizing reservoir 202 to the chamber 351 in the magnet valve device 154 to flow past valve 211 and from thence through passage and pipe 325 to the reduction limiting reservoir 324.

Upon reducing the pressure in the equalizing discharge valve piston chamber 199, the higher brake pipe pressure in chamber 203 operates the piston 197 to unseat the discharge valve 198, which permits fluid under pressure to flow from the brake pipe 55 to the atmosphere by way of pipe 205, passage 204, equalizing piston chamber 203, past the discharge valve 198 and through a choke passage 352.

It will be evident that since the magnet 210 is deenergized substantially immediately upon movement of the brake valve device to service position, the service application and release valve device 185 will promptly operate to effect a service reduction in brake pipe pressure at the rear end of the train at substantially the same time as the service reduction in brake pipe pressure is effected at the front end of the train by the operation of the brake valve device. Thus, the use of the remote control unit in conjunction with the brake valve device results in materially reducing the time required to effect a service reduction in brake pipe pressure as compared with the time required if the reduction in brake pipe pressure had to be effected entirely through the brake valve device on the locomotive. Furthermore, due to the fact that the brakes are applied from the rear of the train, at substantially the same time as from the front of the train, train slack is so controlled as to prevent severe shocks.

The emergency switch devices 5 and 174 on the locomotive and remote control units, respectively, are both subject to brake pipe pressure, but these devices are so designed that a relatively small degree of pressure will maintain them in their circuit closing position, said pressure being, for instance, twenty-five or thirty pounds, or below that to which brake pipe pressure is reduced in effecting a full service reduction in brake pipe pressure.

With the brake valve device 1 in service position, the battery current supply wires 136 and 139 remain connected to the wires 283 and 280, respectively, leading to the train wires 153 and 152, respectively, as in running position.

When the contact 187 is moved out of engagement with the contact 334 in effecting a service application of the brakes, the circuit from the train wires 152 and 153 to the emergency magnet valve devices 155 and 2 on the remote control unit and locomotive, respectively, is thereby opened. However, since the circuit which includes the condenser 171 and the reactor 172 is tuned to resonance at a frequency of four-thirds cycles, the relay device 158 is energized, with the result that the contact 191 is moved into engagement with contact 354 and the circuit to the emergency magnets is closed again. Inasmuch as the emergency magnets 68 and 213 are of the slow acting type, as hereinbefore explained, they will remain energized during the brief interval between the opening of the emergency magnet circuit at the contacts 187 and 334 and the closing of the circuit again at the contacts 191 and 354 and during this interval the valves in the respective emergency valve devices will therefore remain in the normal positions shown in the drawings.

A full service reduction in brake pipe pressure may be effected, or the degree of reduction may be limited to any desired amount less than a full service. In either case, when the desired degree of brake pipe reduction is obtained, the brake valve device is turned from service position to lap position in which passage 253, communicating with the equalizing reservoir 52 and equalizing discharge valve piston chamber 50, is lapped by the rotary valve 20 so as to prevent further reduction in pressure in said reservoir and chamber. The brake pipe pressure acting on the opposite side of the equalizing piston 48 then continues to reduce past the unseated discharge valve 49 until said pressure is slightly below the opposing pressure in chamber 53, at which time the equalizing piston 48 operates in the usual manner to seat the discharge valve 49 and prevent further flow of fluid under pressure from the brake pipe.

In lap position of the brake valve device 1, the contact 32 is moved out of engagement with finger 40, thereby cutting off from the train wires 152 and 153 the supply of one hundred cycle alternating current coded to four-thirds impulses per second. In lap position of the brake valve device, the movable contact 31 engages the finger 39. The finger 39 is connected by wire 150 to the oscillating contact 148 of the coding device 10. The contact 31 is connected through bridge 43 to contact 29 which is connected to the train wire 152 through finger 37, wire 289, contacts 92, 89 and 93 of the switch device 7, wire 281, terminal 390, contact plate 125 of the device 15, terminal 391 and wire 395. The other train wire 153, is connected to contact finger 35 in the brake valve device through wire 396, terminal 394, contact plate 126 in the device 15, terminal 393 and wire 283. The contact finger 35 is connected through contact 27, bridge 42, contact 26 and finger 34 to wire 282 leading to the other contact 147 of the coding device 10. Thus, when the brake valve device is moved to lap position, a circuit is closed from the coding device 10 on the locomotive to the primary winding 160 of the transformer 159 on the remote control unit, thereby inducing current in the secondary winding 162 of said transformer, which causes the master relay device 161 to be energized so that it operates at a frequency corresponding to that of said coding device, that is, two cycles per second.

With the master relay device 161 now operating at a frequency of two cycles per second, there is induced in the tuned circuits on the remote control unit alternating current having a frequency of two cycles per second. The tuned circuit which includes the condenser 171 and the reactor 172, being tuned to resonance at a frequency of four-thirds cycles per second, will become deenergized, with the result that the relay 158 becomes deenergized and the contact 191 thereupon moves out of engagement with the contact 354.

The circuit which includes the condenser 168 and reactor 169, being tuned to a frequency of two cycles per second, becomes energized and this energization causes the relay 157 to be energized, with the result that the contacts 189 and 190 are moved into engagement with the contacts 355 and 190, respectively.

With the contact 190 engaging contact 323, the circuit is closed from the battery 166 through the lap magnet 210 by way of wire 304, the switch device 373, contacts 323 and 190 and wire 324 to one terminal of said magnet, the other terminal of said magnet being connected to said battery by wires 326, 320 and 302. The consequent energization of magnet 210 causes the valve 211 to be seated, so as to prevent further venting of fluid from the equalizing discharge valve piston chamber 199 and the connected equalizing reservoir 202. Fluid continues to be vented from the brake pipe 55 past the discharge valve 198, however, until the brake pipe pressure acting in piston chamber 203 is reduced to slightly below the pressure in chamber 199, at which time the piston 197 is operated to seat the discharge valve 198 in the usual manner.

The reduction in brake pipe pressure may be effected in steps, if desired, by moving the brake valve device 1 first to service position, then to lap position and repeat. Magnet 210 on the remote unit will operate substantially simultaneously with the movement of the brake valve device and permit a reduction in brake pipe pressure to be effected at the rear end of the train in steps equal in amount to the steps of reduction effected by operation of the brake valve device at the head end of the train.

The reduction in equalizing reservoir pressure on the remote unit is limited to equalization with the reduction limiting reservoir 324, which, however, is of such volume as to permit a full service reduction in brake pipe pressure. The use of said reservoir is not so necessary when brake pipe pressure is reduced by the operation of the brake valve device by the engineer, as above described, but said reservoir is desirable when brake pipe pressure is automatically reduced by a change in traffic conditions, as will be hereinafter described.

As brake pipe pressure is reduced at a service rate, fluid flows back from piston chamber 108 of the quick acting valve device 6 on the locomotive to the brake pipe through passages 109 and 110, pipe 110, choke fitting 111 and pipe 83. The higher pressure in valve chamber 112 then shifts the piston 107 and slide valve 113 upwardly until a port 355 registers with a passage 356, which is open to the atmosphere through passage 274. In this position, fluid is vented from valve chamber 112 and the connected volume chamber 115 at a rate corresponding to the service rate of reduction in brake pipe pressure in piston chamber 108 and the movement of the piston 107 and slide valve 113 therefore ceases. Then, when the pressure in valve chamber 112 is reduced slightly below the brake pipe pressure acting in chamber 108, the piston 107 is operated to return the slide valve 113 to the normal position shown in the drawings.

The quick acting valve device 176 on the remote control unit operates the same as the corresponding device on the locomotive when a service reduction in brake pipe pressure is being effected.

With the brake valve device 1 in lap position, the battery current supply wires 136 and 139 remain connected to the wires 283 and 280, respectively, leading to the train wires 153 and 152, respectively, as in running position. When the contact 191 is moved out of engagement with the contact 354, due to the brake valve device being moved to lap position after being in service position, as hereinbefore explained, the circuit from the train wires 152 and 153 to the emergency magnet valve devices 2 and 155 on the locomotive and remote control unit, respectively, is thereby opened. However, since the contact 189 is moved into engagement with the contact 355 by the energization of relay 157, as hereinbefore mentioned, the circuit to said magnets is closed again. The magnets 68 and 213, being of the slow acting type, will remain energized during the brief interval between the opening of the emergency magnet circuit at the contacts 191 and 354 and the closing of the circuit again at the contacts 189 and 355. During this interval, therefore, the valves 69 and 70 in the magnet valve device 2 and the valves 214 and 353 in the magnet valve device 155 will remain in the normal positions shown in the drawings.

Inasmuch as the circuit which includes the condenser 216 and reactor 166 on the remote control unit is not responsive to the two cycle alternating current induced in the secondary winding 165 of the transformer 163, the relay 156 remains deenergized, as when the brake valve device is in service position, and the contacts 187 and 188 remain out of engagement with the respective contacts 334 and 317.

If it is desired to charge the brake pipe 55 to effect a release of the brakes after a service application, the brake valve device is turned first to release position and then to running position. In release position, fluid at main reservoir pressure is supplied directly from valve chamber 19 to passage 256 and from thence through the cut-off valve chamber 60, chamber 61, and through passage and pipe 54, passage 121 in the double-heading cock and switch device 15, and pipe 392 to the brake pipe 55. This supply of fluid at high pressure to the brake pipe accelerates the increase in brake pipe pressure and after the brake valve device has been in release position for a certain length of time, during which the brake pipe at the head end of the train is charged substantially to main reservoir pressure, the brake valve device is turned to running position, in which the supply of fluid to the brake pipe is governed by the feed valve device 247. As the brake pipe pressure is thus increased, fluid at feed valve pressure is also supplied to the equalizing discharge valve piston chamber 50 and to the equalizing reservoir 52 in the same manner as hereinbefore described.

In the release position of the brake valve device, contact fingers 34 and 38 engage contacts 26 and 30, the same as when the brake valve device is in running position, as described in connection with the initial charging of the equipment. Due to this engagement, one hundred cycle alternating current coded to three impulses per second is supplied to the train wires 152 and 153, and as a result, the relay 156 on the remote control unit is energized. With this relay energized, the contacts 187 and 188 are moved into engagement with contacts 334 and 317, respectively.

With the contact 188 engaging the contact 317, the service application and release magnet 206 is energized and supplies fluid from the feed valve device 275 to piston chamber 193 of the service application and release valve device 185, which permits the piston 192 and slide valve 195 to be returned to their release position by spring 196. In release position of slide valve 195, fluid is supplied from the feed valve device 275 to the brake pipe 55, equalizing discharge valve piston chamber 199 and equalizing reservoir 202 in the same manner as when initially charging the brake equipment.

The tuned circuit which includes the condenser 168 and reactor 169, being unresponsive to three cycle alternating current, such as is being supplied at this time to the tuned circuits on the remote control unit, becomes deenergized, with the result that the relay 157 becomes deenergized, permitting the contacts 189 and 190 to move to their circuit opening positions, as shown in Fig. 2.

The movement of the contact 190 to the circuit opening position, causes the lap magnet 210 to become deenergized, which permits spring 212 to unseat valve 211. With said valve unseated, the reduction limiting reservoir 324 is vented to the atmosphere by way of pipe and passage 325, past valve 211, through chamber 351, pipe and passage 327, cavity 328 in slide valve 195 of the service application and release valve device 185 and atmospheric passage 329.

With the brake valve device in release or running position, contact fingers 35 and 37 leading to the train wires 153 and 152, respectively, are connected to the battery current supply wires 136 and 139, respectively, thereby maintaining the circuit to the emergency magnet valve devices 2 and 155 closed at the brake valve device. When the contact 189 is moved to the circuit opening position, as hereinbefore explained, the circuit to the emergency magnets 213 and 68 is opened, but is closed again by the aforementioned movement of the contact 187 to the closed position. During the interval between the opening of the circuit at the contact 189 and the closing of the circuit at the contact 187, the emergency magnets will remain energized due to the slow acting feature embodied in their design.

The tuned circuit which includes the condenser 171 and reactor 172, being tuned to a frequency of four-thirds cycles per second, is not responsive to three cycle current now being supplied to the tuned circuits, and therefore the relay 158 remains deenergized and the contact 191 remains in the circuit opening position, as shown in Fig. 2.

In charging the brake pipe, the valve chamber 112 and volume chamber 115 of the quick acting valve device 6 on the locomotive and the corresponding chambers in the quick acting valve device on the remote control unit are charged to brake pipe pressure in the manner hereinbefore described.

If the engineer desires to effect an emergency application of the brakes, he turns the brake valve device to emergency position in which passage 256 is lapped, so as to cut off the supply of fluid under pressure to the brake pipe, and fluid at main reservoir pressure is supplied from valve chamber 19 to passage 357 leading to chamber 358 at one side of the vent valve piston 66. The piston 66 is thereby operated to unseat the vent valve 64, which permits fluid under pressure to rapidly flow from the brake pipe 55, through pipe 392, the device 15, pipe and passage 54, vent valve chamber 65, past the vent valve 64 to chamber 359 and from thence to the atmosphere through passage 360. This rapid venting of fluid from the brake pipe at the locomotive initiates an emergency wave of reduction in brake pipe pressure, which is adapted to be transmitted serially from car to car toward the rear end of the train, in the usual manner.

When the brake valve device 1 is moved to emergency position, all of the electric circuits controlled by said device are opened, so that the relay 156 on the remote control unit and the emergency magnets 68 and 213 are deenergized.

The deenergization of relay 156 permits the contacts 187 and 188 to move to the circuit opening position. In this position of contact 188, the circuit to the service application and release magnet 206 is open, thereby causing said magnet to become deenergized and the magnet valve device 186 then operates to cut off the supply of fluid under pressure to the brake pipe in the same manner as when a service application of the brakes is effected.

The opening of the circuit to the emergency magnets 68 and 213 causes said magnets to become deenergized. The deenergization of magnet 213 on the remote control unit permits spring 215 to seat valve 214 and to unseat valve 353. With valve 353 unseated, fluid under pressure is supplied from the reservoir 343 to vent valve piston chamber 241 through pipe 344, chamber 361, past valve 353, and thence through pipe 242. Piston 237 is operated by the fluid supplied to chamber 241 to unseat the vent valve 235 so as to rapidly vent fluid under pressure from the brake pipe 55 by way of pipe 339, vent valve chamber 236, past the vent valve 235 to chamber 239 and from thence to the atmosphere through passage 240. This rapid venting of fluid from the brake pipe on the remote control unit initiates an emergency wave of reduction, which is adapted to be transmitted serially from the remote unit forwardly in the train and since it is initiated substantially simultaneously with the initiation of the emergency reduction at the locomotive, the brakes at the front and rear of the train will apply at substantially the same time from the two ends of the train toward the middle of the train.

The deenergization of emergency magnet 68 on the locomotive permits spring 71 to seat valve 70 and to unseat valve 69. With valve 69 unseated, fluid under pressure is supplied from the reservoir 340 to piston chambers 88 and 79 of the vent valve devices 3 and 4, respectively, through pipe and passage 239, chamber 364, past valve 69 and thence through pipe 80. The vent valve 81 is unseated by the pressure of fluid in chamber 88 acting on piston 84 and opens the brake pipe to the atmosphere, and the vent valve 72 is operated by the pressure of fluid in chamber 79 acting on piston 73 to vent fluid from pipe 76, the operation of the vent valve devices 3 and 4 being the same as the vent valve device 175 on the remote control unit.

The sudden venting of fluid from the brake pipe 55 causes an emergency reduction in pressure to be effected in the piston chambers 108 and 227 of the quick acting valve devices 9 and 176, respectively, on the locomotive and remote control unit.

The emergency reduction in pressure in piston chamber 108 permits the pressure in valve chamber 112 to move the piston 107 and slide valve 113 upwardly. Port 355 through said slide valve is of insufficient capacity to reduce the pressure in valve chamber 112 as fast as the brake pipe pressure reduces in piston chamber 108 in effecting an emergency application of the brakes and as a result, the piston 107 and slide valve 113 do not cease moving when the port 355 registers with passage 356, as when effecting a service reduction in brake pipe pressure, but instead are moved to emergency position, in which the passage 270 is uncovered. Fluid under pressure then flows from the valve chamber 112 and volume chamber 115 to chamber 271 and operates piston 117 to unseat the vent valve 116, which quickly vents fluid from piston chamber 103 of the switch device 5 to the atmosphere by way of pipe 104, passages 110 and 109, chamber 266, past the vent valve 116 to chamber 363 and from thence to the atmosphere through passage 274. The venting of fluid from the switch piston chamber 103 permits spring 106 to move the piston 99 downwardly and pull contact 98 out of engagement with contacts 100 and 101. This opens the circuit from the wire 332, which is connected to the emergency magnet 68, to the wire 283 leading to the train wire 153, and since the emergency magnet 213 on the remote control unit is connected in series with the emergency magnet 68 and switch device 5 on the locomotive, the opening of the circuit at the switch device 5 also opens the circuit to the emergency magnet 213. However, the opening of the emergency magnet circuit at the switch device 5 has no significance at this time, because said circuit has already been opened at the brake valve device.

The sudden reduction in brake pipe pressure causes the quick action valve device 176 on the remote control unit to operate in the same manner as the quick acting valve device 6 on the locomotive, and as a result, the contact 217 of the switch device 174 is moved out of engagement with contacts 219 and 220, but this has no significance at this time, because the emergency magnet circuit is already open at the brake valve device.

Pipe 76 on the locomotive being connected by means of pipe 95 to the piston chamber 94 of the switch device 7 and to piston chamber 45 of the brake application valve device, fluid is suddenly vented from said chambers upon operation of the vent valve device 4.

The venting of fluid from piston chamber 94 of switch device 7 permits spring 97 to move contact 89 so as to open the circuit from contact 92 to contact 93 and to close the circuit from contact 91 to contact 93, while the venting of fluid from the application piston chamber 45 permits the pressure of fluid in valve chamber 46 to move piston 44 and slide valve 47 to application position, in which piston 44 engages a gasket 364.

The operation of the switch devices 5, 7, and 174, the emergency magnet 68 and vent valve devices 3 and 4 on the locomotive, and the quick action valve devices 6 and 176 is not necessary when the engineer effects an emergency reduction in brake pipe pressure by moving the brake valve device to emergency position, but the operation of these devices under certain other conditions, which will be described hereinafter, is very necessary and desirable.

Fluid supplied to piston chambers 83 and 79 of the vent valve devices 3 and 4, respectively, on the locomotive, bleeds down by flow through ports 365 and 366 in the respective pistons 84 and 73, and when the pressure in said chambers and in the connected reservoir 340 has been reduced nearly to atmospheric pressure, the springs 85 and 274 act to shift the valves 81 and 72, respectively, to their seats. Similarly, the fluid supplied to piston chamber 241 of the vent valve device 175 on the remote control unit, bleeds down by flow through port 367 in piston 237, permitting the spring 238 to seat valve 235.

In order to charge the brake pipe and thereby effect a release of the brakes after an emergency application, the brake valve device is operated in the same manner as in charging the brake pipe after a service reduction in brake pipe pressure. With the vent valve 72 seated, the flow of fluid under pressure through port 249 in the brake application valve piston 44 builds up a pressure in piston chamber 45, in vent valve chamber 75 and in piston chamber 94 of the switch device 7. When a predetermined pressure is obtained in piston chamber 45, spring 48 moves the piston 44 and slide valve 47 inwardly to their normal position, and when sufficient pressure is obtained in piston chamber 94 of the switch device 7 to overcome spring 97, the piston 90 moves the contact 89 so that it bridges contacts 92 and 93.

With the brake valve device in release or running position and the contact 89 of the switch device 7 connecting contacts 92 and 93, the coding device 9 is connected to the train wires 152 and 153, and as a result, the relay 156 on the remote control unit is energized and causes the contacts 187 and 188 to engage the contacts 344 and 317, respectively.

With the contact 188 engaging contact 317, the energizing circuit to the service application and release magnet 206 is closed and the resulting energization of magnet 206 causes the service application and release magnet valve device 185 to operate in the same manner as hereinbefore described to supply fluid under pressure to the brake pipe and to the equalizing reservoir 202.

When brake pipe pressure is increased to a predetermined degree, the switch device 5 on the locomotive is operated to connect contacts 100 and 101 and the switch device 174 on the remote control unit is operated to connect contacts 219 and 220, all of which contacts are in the circuit to the emergency magnets 68 and 213. With the contact 187 engaging the contact 344 on the remote control unit and the brake valve device in release or running position, the circuit to the emergency magnets is now complete and said magnets become energized and permit the reservoirs 340 and 343 to be recharged with fluid under pressure from the brake pipe.

The quick acting valve device 6 on the locomotive and the corresponding device 176 on the remote control unit are charged with fluid under pressure from the brake pipe in the same manner as in initially charging the train.

If traffic conditions become unfavorable, magnet 127 of the traffic control device 8 on the locomotive is automatically deenergized, which permits spring 129 to unseat valve 128, past which fluid under pressure is vented from the brake application valve piston chamber 45 to the atmosphere through passage 368, pipes 76 and 250, chamber 369, past valve 128, chamber 370 and passage 251. With pipe 76 vented, fluid is also vented from the connected pipe 95 and piston chamber 94 of the switch device 7.

In application position of the brake application valve device, fluid under pressure is vented from the cut-off valve piston chamber 62 through passage 259, cavity 370 in the application slide valve 47 and atmospheric passage 371. This permits feed valve pressure in chamber 61 acting on the opposite side of the cut-off valve piston 57 to move said piston outwardly against spring 63 and pull the valve 56 into engagement with seat rib 59, thereby closing the communication through which fluid is supplied from the feed valve device 247 to the brake pipe 55.

Passage 51, which communicates with the equalizing discharge valve piston chamber 50 and with the equalizing reservoir 52, is connected through cavity 254 in slide valve 47 to passage 262, which in turn is connected through passage and pipe 261 to the reduction limiting reservoir 260. Fluid is thus vented from piston chamber 50 and equalizing reservoir 52 to the reduction limiting reservoir, which permits the equalizing discharge valve piston 48 to open the discharge valve 49 and effect a reduction in brake pipe pressure.

The venting of fluid from piston chamber 94 of the switch device 7, at the same time as fluid is vented from the application valve piston chamber 45, permits spring 97 to operate piston 90 and pull contact 89 out of engagement with contact 92, thereby opening the circuit from the contact 92 to the contact 93, and move contact 89 into engagement with contact 91, thereby completing the circuit from contact 91 to contact 93.

The contact 92 being connected to the contact 148 of the coding device 9 by wire 280, contact finger 37 in the brake valve device 1, contact 29, bridge 43, contact 30, contact finger 38 and wire 149, and the contact 93 being connected to the train wire 152 by wire 281, terminal 390, contact plate 125 of the double-heading cock and switch device 15, terminal 391 and wire 395, the opening of the circuit from contact 92 to contact 93 cuts off from the train wires the supply of one hundred cycle alternating current coded to three impulses per second. As a result, the relay 156 on the remote control unit is deenergized and opens the circuit to the service application and release magnet 206 and also the emergency magnet circuit.

Upon the deenergization of magnet 206, the service application and release valve device 185 operates to effect a service reduction in brake pipe pressure in the same manner as hereinbefore described. On the remote control unit, the reduction effected in equalizing reservoir pressure is limited to equalization of the pressure in the equalizing reservoir 202 into the reduction limiting reservoir 324, the degree of reduction effected, however, being sufficient to ensure a full service reduction in brake pipe pressure.

The contact 96 being connected by contact 89 to contact 93, the circuit is closed from the coding device 11 to the train wire 152, because contact 96 is connected by a wire 372 to wire 151 leading to the contact 148 of said coding device and contact 93 is connected to the train wire 152 in the manner hereinbefore mentioned. With this circuit closed, one hundred cycle alternating current coded to four-thirds impulses per second is supplied to the train circuit and this results in the energization of relay 158 on the remote control unit and the consequent movement of contact 191 into engagement with contact 354, thereby closing the circuit to the emergency magnets 68 and 213, which circuit has been opened by the movement of the contact 187 to the circuit opening position, as previously explained. Thus, the emergency magnet circuit is maintained closed during an application of the brakes initiated by the deenergization of the traffic controlled magnet 127.

On the locomotive, the reduction limiting reservoir 260 is open to the atmosphere through pipe and passage 261, passage 262, cavity 263 in the rotary valve 20 and atmospheric passage 264 when the brake valve device is in running position, so that if the brake valve device is left in running position the reduction limiting reservoir is ineffective and therefore a complete venting of fluid from the equalizing reservoir 52, and consequently from the brake pipe, will occur. If, however, the engineer desires to limit the reduction in brake pipe pressure to a full service reduction and thereby prevent an unnecessary loss of fluid from the brake pipe, he may turn the brake valve device from running position, shown in the drawings, to service position, in which passage 262 is lapped. The lapping of passage 262 prevents the escape of fluid vented to the reduction limiting reservoir, so that the pressure in the equalizing reservoir will be reduced only to equalization into the reduction limiting reservoir and the equalizing discharge valve mechanism will permit only a corresponding full service reduction in brake pipe pressure to occur.

When traffic conditions become favorable again, the magnet 127 on the locomotive is energized and the valve 128 is then seated, which permits the supply of fluid through port 249 in the application valve piston to build up a pressure in the application piston chamber 45 and switch piston chamber 94 equal to the pressure in the application valve chamber, whereupon spring 48 returns the piston 44 and slide valve 47 to their normal position, in which, with the brake valve in release or running position, the cut-off valve is operated to supply fluid under pressure to the brake pipe, the equalizing reservoir 52 is charged with fluid at brake pipe pressure and the reduction limiting reservoir 260 is vented, in the manner hereinbefore described.

Fluid supplied to the piston chamber 94 of the switch device 7 causes the piston 90 to operate so as to move the contact 89 out of engagement with contact 96 and into engagement with contact 92, at the same time maintaining engagement with contact 93. When contact 89 moves out of engagement with contact 96, the supply of one hundred cycle current, coded to four-thirds impulses per second, to the train wire 152 is cut off and this results in the deenergization of relay 156 on the remote control unit and the consequent opening of the emergency magnet circuit at the contact 191. The engagement of contact 89 with contacts 92 and 93 closes the circuit from the oscillating contact 148 of the coding device 9 to the train wire 152 by way of wire 149, contact finger 38 in the brake valve device, contact 30, bridge 43, contact 29, contact finger 37, wire 280, contacts 92, 89 and 93 of the switch device 7, wire 281, terminal 390, contact plate 125 in the combined double-heading cock and switch device 15, terminal 391 and wire 395. The closing of this circuit permits one hundred cycle current coded to three impulses per second to be supplied to the train circuit, causing the relay 156 to be energized and the contacts 187 and 188 to be moved to the circuit closing position.

With the contact 188 in the circuit closing position, the circuit to the service application and release magnet is closed and the resulting energization of magnet 206 causes the service application and release valve device 185 to operate in the same manner as hereinbefore described to supply fluid under pressure to the brake pipe and to the equalizing reservoir 202 and to vent the reduction limiting reservoir 324.

The contact 187 being in the circuit closing position, the circuit to the emergency magnets is maintained closed.

It is obvious that since the emergency magnets 68 and 213 are series connected in the train circuit, failure of said circuit from any cause, such as a broken train wire, will cause both magnets to become deenergized and as a consequence an emergency application of the brakes will be initiated simultaneously at both ends of the train.

If a sudden reduction in brake pipe pressure should be initiated in the train, due for instance to a burst brake pipe hose, the reduction is transmitted serially from car to car in both directions from the point of initiation, in the usual manner. If the point of initiation should be near the middle of the train, the resultant slack action will not be excessive, but if the sudden reduction in brake pipe pressure should be initiated near either end of the train, damaging shocks might result with the usual pneumatic type of brake equipment. According to our invention, however, if the point of initiation is near the locomotive, then just as soon as the emergency rate of brake pipe reduction reaches the locomotive, the quick acting valve device 6 promptly operates to vent pipe 104 and the switch piston chamber 103 so as to permit spring 106 to move switch contact 98 out of engagement with contacts 100 and 101 and thus open the circuit to the emergency magnets. The consequent deenergization of magnet 68 causes fluid under pressure to be supplied to the vent valve devices 3 and 4, but since the brake pipe is already vented on the locomotive, the operation of the vent valve device 3 is unnecessary, but the operation of the vent valve device 4 is necessary in order to cause the brake application valve piston 44 to move the slide valve 47 to application position and to cause the piston 90 of the switch device 7 to pull the contact 89 out of engagement with contact 92.

With the brake application valve slide valve 47 in application position, the cut-off valve 56 is operated to cut off the supply of fluid under pressure to the brake pipe at the head end of the train.

The deenergization of emergency magnet 213 on the remote unit causes fluid under pressure to be supplied to the vent valve device 175, causing said device to operate to initiate a sudden reduction in brake pipe pressure which is propagated serially from the rear end of the train forwardly in the train, applying the brakes. Accordingly, the brakes at the rear end of the train are applied at substantially the same time as those at the front end of the train and as a result, the slack in the train is so controlled that damaging shocks are prevented.

With the contact 89 of the switch device 7 out of engagement with contact 92, the supply to the train circuit of one hundred cycle alternating current coded to three impulses per second is cut off, causing the relay 156 to become deenergized and the circuit to the service application and release magnet 206 thereby deenergized. The deenergization of magnet 206 causes the service application and release valve device 185 to operate to cut off the supply of fluid under pressure to the brake pipe 55 at the rear end of the train.

If the sudden reduction in brake pipe pressure, due possibly to a burst hose, is initiated near the rear end of the train, the quick acting valve device 176 on the remote control unit operates to vent piston chamber 224 of the switch device 174. Spring 222 then moves piston 218 so as to pull the contact 217 out of engagement with contacts 219 and 220, thereby opening the circuit to the emergency magnets 213 and 68 and thereby causing said magnets to become deenergized.

The deenergization of magnet 213 on the remote control unit causes the vent valve device 175 to operate to initiate an emergency reduction in brake pipe pressure at the rear end of the train. The deenergization of magnet 68 on the locomotive causes the vent valve device 3 to operate and initiate an emergency reduction in brake pipe at the head end of the train. The vent valve device 4 is also operated at the same time as the vent valve device 3 to vent fluid under pressure from the brake application valve piston chamber 45 to cause the brake application valve to operate and cut off the supply of fluid under pressure to the brake pipe at the head end of the train, and also to cause the switch device 7 to operate and cut off from the train wires the supply of current for energizing the relay 156 on the remote control unit. The consequent deenergization of relay 156 causes the service application and release magnet 206 to become deenergized and as a result the service application and release valve device 185 operates to cut off the supply of fluid under pressure to the brake pipe at the rear end of the train.

It will be seen from the foregoing that if a sudden venting of the brake pipe is initiated near the head end of the train, the quick action valve device 6 on the locomotive will automatically operate to start a sudden reduction in brake pipe pressure at the rear end of the train and also to cut off the supply of fluid under pressure to the brake pipe at both ends of the train, while if the sudden reduction in brake pipe pressure is near the rear end of the train, the quick action valve device 176 on the remote control unit will respond and initiate a sudden reduction in brake pipe pressure at the head end of the train and cause the supply of fluid under pressure to the brake pipe at both ends of the train to be cut off.

It will be evident that if any wire in the emergency magnet circuit becomes broken, or if the electric power is lost, an emergency application of the brakes will be initiated at both ends of the train. It will further be evident that neither magnet 68 on the locomotive nor magnet 213 on the remote control unit can be shorted without causing an emergency application of the brakes to be effected.

As hereinbefore explained, the energization of the emergency magnets indicates the integrity of the emergency magnet circuit. The energization of said magnets also indicates the integrity of the coding circuits throughout the train, including the tuned relay circuits on the remote control unit, because the emergency magnet circuit is controlled by contacts controlled by said relays. It is customary after a train has been charged and before leaving the terminal to apply, lap and release the brakes in order to determine whether they are in proper operating condition. With the brake valve device in running position, the relay 156 is energized and maintains the contact 187 in engagement with contact 334, thereby maintaining the emergency magnet circuit closed. When the brake valve device is moved to service position, the relay device 156 is deenergized and opens the emergency magnet circuit, but the relay device 158 is energized so as to cause contact 191 to engage contact 354 and thereby maintain the emergency magnet circuit closed. When the brake valve device is moved to lap position, both relays 156 and 158 are deenergized, but the relay 157 is energized so as to move contact 189 into engagement with contact 355 and thereby maintain the emergency magnet circuit closed.

It will be noted that the choked coupling or plug 111 is interposed between the quick acting valve device 6 on the locomotive and the brake pipe 55. The purpose of this choked coupling is to so restrict the flow of fluid from the brake pipe to the pipe 104 that the pressure in pipe 104 and switch piston chamber 103 can be vented by the quick acting valve device 6 in the shortest possible time without material interference by the inrush of fluid to pipe 104 from the brake pipe. The flow area of the passage through the choked coupling 111 is, however, sufficiently great to permit emergency rate of reduction in brake pipe pressure to be transmitted from the brake pipe 55 to the piston chamber 108 of the quick acting valve device for causing same to operate. The choked coupling 331 is provided between brake pipe 55 and the quick acting valve device 176 on the remote control unit for the same purpose.

If for any reason, such as failure of electric power or a broken pipe, it becomes impossible to control the train brakes through the electric means provided on the locomotive and remote control unit, then either the cause of failure must be rectified before the brakes can be released or the electric means on both the locomotive and remote control unit must be cut out of operation, after which the brakes may be released and controlled pneumatically from the locomotive in the usual manner.

In order to render the electric brake means ineffective, the switch device 137 on the locomotive is moved to the open position so as to cut off the supply of current from the battery unit 12 to the alternator 13 and to the brake valve device 1. If the vent valves 72 and 81 are open, the fluid pressure on opposite sides of the vent valve pistons 73 and 84 will equalize, which permits spring 74 to seat the vent valve 72 and spring 85 to seat the vent valve 81.

The seating of vent valve 72 permits charging of the brake application valve piston chamber 45, assuming the train to be in a territory where the brakes are automatically controlled by traffic conditions and the traffic conditions are favorable. The brake application valve parts are then returned to their normal position in which the brake pipe is charged with fluid under pressure through the brake valve device and the brakes are consequently released in the usual manner.

On the remote control unit, a cock 374 is provided in the brake pipe branch pipe 205 and main reservoir pipe 279, said cock comprising a plug valve 375 having a handle 376 for turning said plug valve from the cut-in position shown in the drawings to a cut-out position in which communication through pipes 205 and 279 is interrupted, so that if for any reason magnets 206 or 213 or the valve device 185 should become inoperative, or if a control pipe should become broken, the remote unit can be cut off from the brake pipe and, therefore, have no control over the pressure of fluid in the brake pipe.

By thus disconnecting the remote control unit from the brake pipe, the brake pipe must be charged with fluid under pressure from the brake valve device on the locomotive, and the brake pipe pressure must be reduced through the operation of said brake valve device in the usual manner. The resultant purely pneumatic control of the train brakes from the locomotive is not provided as a substitute for electrical control, but merely to permit the engineer to operate the train until he can reach a terminal where the damage or cause of failure can be repaired.

When the electric brake control is cut out of operation by moving the switch device 137 to the open position, the switch device 373 on the remote control unit is also moved to the open position in order to prevent depletion of the battery 166.

When the electric brake control is rendered ineffective as above described, it will be noted that the traffic controlled means are still operative to effect a service application of the brakes in case the traffic conditions become unfavorable. The operation of the switch device 7 will, however, be ineffective to cause a service application of the brakes to be simultaneously effected at the rear end of the train if the train brakes are applied due to a change in traffic conditions, so that the brake application will be effected entirely from the front end of the train.

If at any time the train is operating in territory where there is no provision for the control of train brakes by traffic conditions, the traffic controlled magnet means 8 will be deenergized. However, in order to prevent the deenergization of said magnet from interfering with the control of the train brakes either electrically or pneumatically, as hereinbefore described, a cock 377 is interposed in pipe 76. The cock 377 comprises a plug valve 378 and a handle 379 for turning said plug valve from the cut-in position shown in the drawings to a cut-out position, in which communication to the traffic controlled means 8 is closed, so that the brake application valve will still be controlled by the operation of magnet 68 through the vent valve device 4.

It will be understood that suitable filters and condensers are provided in the various circuits for blocking the flow of current of undesirable character to various parts of the equipment. Filter 380, interposed in the wire 139, blocks the flow of one hundred cycle alternating current, thus isolating the battery unit 12, the generator 13 and the actuating mechanism of the coding relays 9, 10 and 11 from alternating current impulses. A filter 381 is provided in wire 338 to prevent passage of one hundred cycle alternating current across the wires 280 and 281 in the circuit with the train wire 152. If said filter were not employed, then the automatic application of the train brakes through the medium of the traffic controlled means 8 would be interfered with. With the traffic controlled means 8 deenergized due to unfavorable traffic conditions, piston chamber 94 in the switch device 7 is vented, as hereinbefore explained, permitting the piston 90 to be moved to the position wherein contact 89 bridges contacts 96 and 93, thereby closing a circuit through which one hundred cycle alternating current coded to four-thirds impulses per second is supplied to the wire 281 for causing the relay 158 on the remote control unit to become energized so as to maintain the emergency magnet circuit closed. If the filter 381 were not used, then when the contact 89 is in the position for supplying alternating current coded to four-thirds impulses per second, alternating current coded to three impulses per second would also be supplied to wire 281, with the brake valve device in running position, and this would interfere with the intended operation of the remote controlled apparatus on the remote controlled unit. It will be understood that filters 380 and 381 permit the flow of direct current to the train wires 152 and 153.

A condenser 382 is disposed in the wire 283 on the locomotive, the emergency magnet 68 and switch device 5 being arranged in a shunt circuit around said condenser. The condenser 382 prevents the flow of direct current directly through wire 283 to the train circuit. Thus, direct current supplied to wire 283 must flow through the emergency magnet 68 and the switch device 5.

A condenser 383 interposed in the wire 282 on the locomotive prevents the flow of direct current therethrough and a condenser 183 in the wire 182 on the remote control unit prevents the flow of direct current therethrough.

A condenser 384 is connected across the wires 333 and 335 on the remote control unit for the purpose of reducing the severity of the arc caused by the opening of electric circuits at the contacts 187, 189 and 191. Similarly, a condenser 385 connected across the wires 318 and 319 and a condenser 386 connected across the wires 318 and 324 reduce the severity of the arcs at the respective contacts 188 and 190 when said contacts are operated to open the respective electric circuits.

In a double-heading service, when two locomotives equipped with the locomotive portion of the electro-pneumatic brake equipment hereinbefore described, are coupled together, the control of the train brakes, either electrically or pneumatically, will be from the head locomotive and the control on the second locomotive will be rendered ineffective. To render the control from the second locomotive ineffective, the handle 120 of the combined double-heading cock and switch device 15 is moved from its vertical position as shown in Fig. 1 to a horizontal position, causing the valve 119 to rotate and close off communication from the brake valve device 1 to the brake pipe, thus rendering the brake valve ineffective to control the brakes. The switch arms 123 and 124 rotate with the valve 119 and when the device 15 is in its double-heading position, the contact plate 125 is out of contact with the contact terminals 390 and 391 and the contact plate 126 is out of contact with the contact terminals 393 and 394, so that the circuit is open from the brake valve device on the second locomotive to the train wires.

It will now be evident that we have provided means whereby the application and release of brakes in a long train may be effected in such a manner as to effectively control the slack in the train and prevent damaging shocks. This means comprises apparatus on the locomotive for supplying alternating current of different characteristics to a two-wire train circuit according to the operating position of the brake valve device on the locomotive and means on the caboose adapted to distinguish between these different alternating current characteristics, so as to substantially simultaneously reproduce on the caboose the functions of said brake valve device, thereby accelerating the application and release of the brakes on the whole train.

One very important feature is the provision of an emergency magnet valve device on the locomotive and an emergency magnet valve device on the caboose, said magnets being connected in series in the above mentioned train circuit. The emergency magnet circuits being normally closed, when the emergency magnet on the locomotive and the emergency magnet on the caboose are energized, the engineer and trainmen are assured of the integrity of the emergency brake control on the train. The energization of the emergency magnets also indicates, during a terminal test of the brakes, the integrity of the coding circuits throughout the train, including the tuned relay circuits on the caboose.

If, for any reason, such as a broken train wire, a loss of power, or a burst brake pipe hose, the emergency magnet on the locomotive or that on the caboose should become deenergized, an emergency application of the brakes will be immediately effected at the locomotive and at the caboose, thereby assuring the safety of the train.

The electrical control apparatus on the locomotive and on the caboose is responsive to brake valve operation as well as to changes in traffic conditions and means are provided for cutting out the traffic control, if desired. Means are also provided for cutting out the electrical control, if necessary, so that the train brakes can be controlled only from the locomotive by the brake valve device or by changes in traffic conditions. If necessary, both the traffic condition control and electrical control may be cut out, in which case the train brakes can be controlled only by the brake valve device on the locomotive.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. The combination with a brake pipe on a train, of two train wires extending through the train, a source of direct current, direct current controlled normally energized electro-responsive means on a car in the train connected across said train wires and operative upon deenergization to effect a sudden reduction in brake pipe pressure, a pair of switch devices parallel connected in the circuit with said electro-responsive means, a source of alternating current of one characteristic, a second source of alternating current of another characteristic, a brake valve device on the locomotive having a running position for connecting said source of direct current across said train wires and for connecting the first mentioned source of alternating current to said train wires, switch means on the locomotive having a normal position for closing the circuit from said brake valve device to said train wires and operative to another position for opening said circuit and for closing a circuit from said second source of alternating current direct to the train wires, means in a shunt circuit around said switch means when in the first mentioned position for blocking the flow of alternating current through said shunt circuit, electro-responsive means on said car responsive only to current from the first mentioned source of alternating current for effecting closure of one of said pair of switch devices and operative upon deenergization to effect a service reduction in brake pipe pressure and to effect opening of said switch device, electro-responsive means on said car responsive only to current from the second mentioned source of alternating current for effecting closure of the other of said pair of switch devices, valve means on the locomotive operative to effect a reduction in brake pipe pressure, means controlled by traffic conditions and operative when traffic conditions become unfavorable to effect the operation of said valve means and said switch means to the second mentioned position, means for blocking the flow of alternating current to said source of direct current, means for blocking the flow of direct current to said source of alternating current, and means for blocking the flow of direct current to said electro-responsive means on the car.

2. The combination with a brake pipe on a train, of a normally energized electro-responsive device operative upon deenergization to effect a sudden reduction in brake pipe pressure, normally energized electro-responsive means on a car in the train operative upon deenergization to effect a service reduction in brake pipe pressure and to effect the opening of the energizing circuit to said electro-responsive device, valve means on the locomotive operative to effect a service reduction in brake pipe pressure, and means controlled by traffic conditions and operative when traffic conditions become unfavorable to effect the operation of said valve means and to effect the opening of the energizing circuit to said electro-responsive means and also to effect the closure of the energizing circuit to said electro-responsive device.

3. The combination with a brake pipe on a train, of a normally energized electro-responsive device operative upon deenergization to effect a sudden reduction in brake pipe pressure, normally energized electro-responsive means on a car in the train operative upon deenergization to effect a service reduction in brake pipe pressure and to effect the opening of the energizing circuit to said electro-responsive device, a normally deenergized electro-responsive element operative upon energization to close the energizing circuit to said electro-responsive device, valve means on the locomotive operative to effect a service reduction in brake pipe pressure, and means controlled by traffic conditions and operative when traffic conditions become unfavorable to effect the operation of said valve means and to effect the opening of the energizing circuit to said electro-responsive means and also to effect the energization of said electro-responsive element.

4. The combination with a brake pipe on a train, of a normally energized electro-responsive device operative upon deenergization to effect a sudden reduction in brake pipe pressure, electro-responsive means on a car in the train operative upon deenergization to effect a service reduction in brake pipe pressure and to effect the opening of the energizing circuit to said electro-responsive device, switch means having a normal position for closing the energizing circuit to said electro-responsive means and operative to another position for opening said energizing circuit and for effecting the closure of the energizing circuit to said electro-responsive device, valve means on the locomotive operative to effect a service reduction in brake pipe pressure, and means controlled by traffic conditions and operative when traffic conditions become unfavorable to effect the operation of said valve means and said switch means to the second mentioned position.

5. The combination with a brake pipe on a train, of a normally energized electro-responsive device operative upon deenergization to effect a sudden reduction in brake pipe pressure, electro-responsive means on a car in the train operative upon deenergization to effect a service reduction in brake pipe pressure and to effect the opening of the energized circuit to said electro-responsive device, a normally deenergized electro-responsive element operative upon energization to close the energizing circuit to said electro-responsive device, switch means having a normal position for closing the energizing circuit to said electro-responsive means and operative to another position for closing the energizing circuit to said electro-responsive element, valve means on the locomotive operative to effect a service reduction in brake pipe pressure, and means controlled by traffic conditions and operative when traffic conditions become unfavorable to effect the operation of said valve means and said switch means to the second mentioned position.

6. The combination with a brake pipe on a train, of two train wires extending through the train, a source of electric current of one characteristic, a second source of electric current of another characteristic, a normally energized electro-responsive device operative upon deenergization to effect a sudden reduction in brake pipe pressure, electro-responsive means on a car in the train connected across said train wires and responsive only to current from the first mentioned source of electric current for effecting closure of the energizing circuit to said electro-responsive device and operative upon deenergization to effect a service reduction in brake pipe pressure and to effect the opening of the energizing circuit to said electro-responsive device, an electro-responsive element on said car connected across said train wires and responsive only to current from the second mentioned source of electric current for effecting closure of the energizing circuit to said electro-responsive device, switch means having a normal position for supplying current from the first mentioned source to said train wires and operative to another position for supplying current from the second mentioned source to said train wires, valve means on the locomotive operative to effect a service reduction in brake pipe pressure, and means controlled by traffic conditions and operative when traffic conditions become unfavorable to effect the operation of said valve means and said switch means to the second mentioned position.

CLYDE C. FARMER.
RAYMOND E. MILLER.